UNITED STATES PATENT OFFICE.

THOMAS ODLUM, OF RICHMOND, VIRGINIA.

WELDING COMPOUND.

SPECIFICATION forming part of Letters Patent No. 589,218, dated August 31, 1897.

Application filed June 23, 1897. Serial No. 641,942. (No specimens.)

*To all whom it may concern:*

Be it known that I, THOMAS ODLUM, a British subject, residing at Richmond, in the county of Henrico and State of Virginia, have invented certain new and useful Improvements in Welding Compounds; and I do hereby declare the following to be a full, clear, and exact description of the invention, such as will enable others skilled in the art to which it appertains to make and use the same.

My invention relates to improvements in compounds for use in assisting the welding of metals, and has for its object to provide a new and useful compound by the use of which iron or steel may be firmly welded with ease and at a less heat or without injurious effects at a high heat, reducing greatly the cost of the operation and restoring the life to any portions of the metal that may be burned.

By the use of my compound a weld may be produced with a heat of any degree, from a low red heat to a high white heat. The compound acts as a flux to produce an adhesion, which when the metal is hammered becomes a firm weld, and at the same time the life is restored to any part of the metal which may have been burned.

The compound is composed of an intimate mixture of common sand, ground marble, borax, common salt, and powdered charcoal in about the proportions hereinafter named: common sand, thirty-two per cent.; ground marble, fifty per cent.; borax, twelve per cent.; common salt, four per cent.; powdered charcoal, two per cent.

The above proportions are not essential, but may be varied within reasonable limits as desired.

The mixture is effected in any suitable preferred manner.

It has been found in practice that a weld may be produced with the aid of the above compound with more ease, more simplicity, and with a higher heat than by any other process or with the aid of any other compound known to me, and that a better adhesion and consequently a firmer weld is produced.

Having thus described my invention, what I claim, and desire to secure by Letters Patent of the United States, is—

1. A compound for use in facilitating the welding of metals, and for restoring life to burned metals, comprising a mixture of sand, ground marble, borax, salt, and powdered charcoal, in approximately the proportions named.

2. A welding compound, composed of sand, ground marble, borax, salt, and powdered charcoal.

In testimony whereof I affix my signature in presence of two witnesses.

THOS. ODLUM.

Witnesses:
ALLEN G. COLLINS,
H. A. HARE.